(12) United States Patent
Bitman et al.

(10) Patent No.: US 8,824,039 B2
(45) Date of Patent: Sep. 2, 2014

(54) APPARATUS FOR DISPLAYING INFORMATION

(75) Inventors: Andriy Bitman, Dortmund (DE); Frank Bartels, Hattingen (DE)

(73) Assignee: Advanced Display Technology AG, Appenzell (CH)

( * ) Notice: Subject to any disclaimer, the term of this patent is extended or adjusted under 35 U.S.C. 154(b) by 209 days.

(21) Appl. No.: 13/261,023

(22) PCT Filed: May 14, 2010

(86) PCT No.: PCT/DE2010/000542
§ 371 (c)(1),
(2), (4) Date: Jan. 11, 2012

(87) PCT Pub. No.: WO2010/136013
PCT Pub. Date: Dec. 2, 2010

(65) Prior Publication Data
US 2012/0105935 A1    May 3, 2012

(30) Foreign Application Priority Data
May 27, 2009 (DE) .......................... 10 2009 022 788

(51) Int. Cl.
*G02B 26/00* (2006.01)
*G09F 9/37* (2006.01)
*G09F 13/24* (2006.01)
*G09F 13/04* (2006.01)

(52) U.S. Cl.
CPC ................ *G09F 9/377* (2013.01); *G09F 9/372* (2013.01); *G09F 2013/0422* (2013.01); *G09F 13/24* (2013.01); *G02B 26/004* (2013.01)
USPC ....................................................... 359/290

(58) Field of Classification Search
USPC .......................... 359/228, 290–292; 345/105
See application file for complete search history.

(56) References Cited

U.S. PATENT DOCUMENTS

| | | | |
|---|---|---|---|
| 4,583,824 A | 4/1986 | Lea | |
| 5,717,283 A | 2/1998 | Biegelsen et al. | |
| 6,284,352 B1 * | 9/2001 | Biegelsen et al. | 428/207 |
| 6,700,556 B2 | 3/2004 | Richley et al. | |
| 2003/0020685 A1 * | 1/2003 | Richley et al. | 345/105 |
| 2008/0130087 A1 | 6/2008 | Miyata et al. | |
| 2009/0046045 A1 | 2/2009 | Ikegami | |
| 2010/0208328 A1 | 8/2010 | Heikenfeld et al. | |
| 2011/0177813 A1 | 7/2011 | Uemura et al. | |

FOREIGN PATENT DOCUMENTS

| | | |
|---|---|---|
| EP | 0 783 163 A1 | 7/1997 |
| WO | WO 2008/046842 A1 | 4/2008 |
| WO | WO 2008/090967 A1 | 7/2008 |
| WO | WO 2009/036272 A1 | 3/2009 |
| WO | WO 2010/016368 A1 | 2/2010 |

* cited by examiner

*Primary Examiner* — Tuyen Tra
(74) *Attorney, Agent, or Firm* — Marshall & Melhorn, LLC

(57) ABSTRACT

The invention relates to an apparatus for displaying information by way of at least one fluid. For this purpose, the apparatus comprises at least one display element having two volumes, wherein the first volume is disposed between a transparent cover layer and a non-transparent intermediate layer and the second volume is disposed between the intermediate layer and a final layer such that only the content of the upper volume is visible. The display according to the invention further comprises at least one fluidic transition, by way of which the fluid can be transported between the two volumes. The apparatus according to the invention has an optimized space requirement, solves the problem of uneven saturation over the surface of a display element, and is additionally not sensitive to mechanical interference.

19 Claims, 2 Drawing Sheets

APPARATUS FOR DISPLAYING INFORMATION

BACKGROUND OF THE INVENTION

The invention relates to an apparatus for displaying information comprising at least one display element which includes:
- a fluid, the surface energy thereof may be varied by means of an electric field;
- a first and a second volume for receiving said fluid, wherein only the first volume is visible and the volumes are separated by a non-transparent intermediate layer; and
- a fluidic transition between said first and said second volume, wherein said first volume is arranged between an optically transparent cover layer and said non-transparent intermediate layer and said second volume is arranged between said intermediate layer and a final layer and all layers are parallel across their entire area. Such systems feature by their bistability with respect of both intended locations of the fluid, either in the one or in the other volume. Consequently, no further energy input is necessary when the fluid has reached the desired volume to maintain it stably therein.

Such fluidic displays are well known from the prior art. Principally all of them always use a plurality of display elements or image dots, also referred to as pixels, mostly arranged in rows and columns and individually controllable, to display a complex image. It is characterizing for fluidic displays that one or more moveable fluids serve to make each single image dot visible. Due to the fact that for making the image dot visible transport of the respective fluid from one reservoir into a visible region of the display and back therefrom is necessary, the known systems often include pumps or realize the fluid transport with the aid of the effect of electro wetting ("electro wetting"). Since for the last mentioned alternative movement of the fluid is based on the possibility to influence the surface energy of a fluid by means of an electric field, such apparatus are in particular characterized in that use of moveable parts is not required.

As already mentioned, it is always mandatorily required for display apparatus which are based on making an image dot visible with the aid of a moveable fluid that the fluid in case that it must not be visible can be stored in a capacity volume or reservoir which is not visible for the viewer. For known systems it is a consequence that the display apparatus in a dimension perpendicular to the viewing plane comprises a non negligible thickness or, if the reservoirs or non visible fluid capacity volumes are arranged in the viewing plane, the display element comprises a decreased use of area and therefore pixel density and consequently lower resolution.

Display elements known from the prior art often show saturation levels varying across the display area which are induced by the fact that fluid layers of varying thickness are present in the visible part of the display element. Thicker layers do not only appear more intensely coloured than thinner ones, but moreover also darker.

A further disadvantage of the known systems is related to the problem that the fluids used in the display do not only move when actually desired, but for example also when in non predictable manner occurring mechanical forces act on the display element during operation. In the most simple case this may already occur by tilting the display element, so that the influence of gravity to the fluids contained therein will change.

WO 2009/036272 A1 discloses an apparatus of the aforementioned type, comprising a visible area, a reservoir as well as a polar and a non polar fluid, wherein respectively one of the fluids dependent on a charged electric field is present either in the visible region or in the reservoir. Due to the comparably low degree of symmetry of the disclosed display elements these are not suitable to be combined as space saving as possible to form a display apparatus.

It is therefore the object of the invention to propose a display element which comprises an optimized utilization of space, possesses a uniform colour saturation across the entire area and is not sensitive to mechanical interference.

SUMMARY OF THE INVENTION

According to the invention, this object is solved by an apparatus of the aforementioned type, wherein the fluidic transition in viewing direction orthogonal to the visible first volume connects a lateral end of the first volume with a lateral end of the second volume; and both the first and the second volume and also the volume of the fluid are equal, so that the fluid volume can be transported from one of the volumes into the other volume parallel to the layers to the fluidic transition in a dimensionally stable manner, wherein that fraction of the fluid volume which is present in the visible volume extends over the entire height between cover layer and intermediate layer.

Such a display element is characterized in that it may be operated such that when discharging the fluid, a fluid-free space occurs in the respectively empty volume at the end opposite the lateral end. It immediately results in combination with the feature that the fluid always extends over the entire height also during discharging and thus is in contact with the cover layer as well as with the intermediate layer, that no colour saturation variations will be perceived by the viewer. Since the colour layer is conveyed laterally out of the visible volume or into the same, respectively, with constant thickness, merely the intensity of the light reflected with the respective colour decreases.

Preferably, transport of the fluid between the two volumes occurs with the aid of the electro wetting effect. It is in particular preferred to arrange the display elements of the apparatus according to the invention in rows and columns, for example in five rows and seven columns (5×7—matrix display).

For optionally making visible or covering the display fluid the display element includes two volumes which are, when seen in a viewing direction, arranged in planes one after the other, wherein the first volume is arranged between a transparent cover layer and a non-transparent intermediate layer and the second volume between this intermediate layer and a final layer. In this way, only the content of the upper volume is visible, whereas the content of the lower volume is hidden to the viewer. In order to convey the fluid between the two volumes, the apparatus for displaying information according to the invention comprises a fluidic transition between a lateral end of the first volume and a lateral end of the second volume. It is in particular preferable to realize the fluidic transition in form of a duct which provides a shortest connection between the volumes and is orthogonal to the parallel planes. In such an embodiment the duct may in the simplest case be an opening in the non-transparent intermediate layer.

It is essential for the invention that, caused by the parallelity of the layers, these comprise an identical distance with respect to another at each point and thus also the surrounding volume is characterized by a high symmetry. When the fluid is conveyed to the lateral end of the volume in which the fluid is located, for transport from one volume into the other one, this may occur without any changes of the geometry of the fluid volume at least in a region of the visible volume visible for a viewer. Consequently, also the perceivable colour saturation is constant during filling or discharging, respectively.

Even though it is not mandatory for ensuring a constant colour saturation that also the non-visible volume is bordered by parallel layers, this is required for the achievement of space optimized, highly symmetry display elements. Only in this way it can be ensured that the fluid will be completely received in both volumes without unutilized voids remaining in one of the volumes even after complete receipt of the fluid.

A particularly preferred apparatus includes several display elements and is characterized in that the respectively second volume of a display element is arranged below the first volume of an adjacent display element at least except for the region of the fluidic transition. Also space-optimized is an apparatus in which the volumes of a display element seen in viewing direction are arranged one after the other. Based on these aforementioned embodiments it may be recognized that, in order to achieve at a best utilization of space, the first and the second volume should not only be identical with respect to their size, but also with respect to their geometry. It is also common to both embodiments that one of the visible volumes respectively covers exactly that area required to arrange a second volume in a non-visible manner.

With the aid of the apparatus according to the invention, therefore, fluidic displays may be realized wherein on the one hand the image dots are arranged immediately adjacent to another in the image area and, on the other hand, only so much space must be provided in the dimension orthogonally to the viewing plane as is actually required for receiving the fluids within the image dots. In particular, unused interspaces between the volumes of second type can be avoided.

Already when both volumes are filled approximately half with liquid and with a gas, it is not possible to convey the liquid from one volume into the other one without providing the possibility of a pressure balance. Therefore, it is preferably provided according to the invention that the intermediate layer comprises at least one further fluidic transition for fluidic pressure balance between the two volumes. In case that the further fluidic transition must be merely suitable to let escape the displaced gas, significantly smaller cross sections, as compared to the first fluidic transition, are sufficient. In case that also a liquid is to be passed through the further fluidic transition, it is preferred that the cross section of this further transition corresponds approximately the cross section of the first transition.

Thereby, it is in particular preferred to provide two of the further transitions in the intermediate layer for fluidic pressure balance, wherein the first transition is according to the invention arranged at a lateral end of a volume and the two further transitions at an opposite end of the same volume. The distance of the first transition from the two others is correspondingly preferably maximized.

To avoid an undesired transfer of fluid from one volume into the other as a consequence of external influence to the display element, for example in form of mechanical forces, it is provided according to the invention that a wall is disposed at least in one of the volumes. Preferably, this wall extends at least partly over the entire height of the respective volume. In particular preferred, the wall borders the fluidic transition, is perpendicular to the intermediate layer, extends over the entire height of the respective volume and comprises a central interruption of small height. The interruption may be realized for example in form of one or more holes. Preferably, the wall is dimensioned such that merely through influencing the surface tension with the aid of an electric field, this tension may be changed such that the fluid may overcome the wall and may enter into the other volume through the fluidic transition.

According to a further embodiment, it is provided that the wall borders the second fluidic transition serving for pressure balance, is perpendicular to the intermediate layer, extends only over a part of the entire height of the respective volume and comprises a central interruption.

Principally, the wall may be embodied without interruptions and may comprise a height which is lower than the height of the respective volume. In an alternative embodiment, at least one bar splitting or reducing the transition is arranged in the region of the fluidic transition to avoid an undesired transfer of fluid from one volume into the other one. Thereby, the thickness of the bar corresponds preferably to the thickness of the intermediate layer. It is in particular preferred to integrate the bar into the intermediate layer itself, for example by means of punching or by providing corresponding openings during manufacturing the intermediate layer. Preferably, the width of the bar is so dimensioned that it covers only a small part of the respective opening to the fluidic transition, in order to increase the length of the edges of the opening on the one hand and to avoid unintended overflow without hindering the intended initiated transfer. It is in particular preferred that the bar is parallel to the shortest sides of an opening to the fluidic transition. It is furthermore possible to arrange several identical or different bars in an opening, for example to obtain such a structure having correspondingly long side lengths. The arrangement of bars is furthermore not only suitable for the opening to the first fluidic transition, but also for the openings to the further fluidic transition.

It is provided according to the invention that the disclosed apparatus includes at least one electrically conducting layer and/or coating for providing at least one counter electrode as well as individual control electrodes for each display element. This means that electrically conducting filler material, for example aluminium or copper, but also coatings consisting of conducting materials, for example sputtered aluminium layers or the like, may serve as electrodes. While the control electrodes for each display element may be individually controllable, the counter electrode may preferably be provided as a large area common electrode for all display elements of a display.

It is likewise possible that the apparatus comprises a common control electrode for at least two display elements. Such an embodiment of the invention is in particular appropriate when selection of the control of display elements is to be realized with the aid of a passive matrix. A possible option is for example a configuration in which 35 display elements are arranged in 7 rows and 5 columns, wherein respectively all display elements of a column are connected to the same control electrode. Selection of the display elements for individual control is then achieved with the aid of the passive matrix by counter electrodes comprised within the intermediate layer wherein respectively one includes all of the display elements arranged in one of the 7 rows and is perpendicular to the control electrodes.

It is in fact possible to arrange both the counter electrodes and the control electrodes in one and the same layer. This, however, has the disadvantage that propagating field lines are curved and under certain circumstances do not penetrate the whole volume of the fluid, but only those regions in the vicinity of the surface of electrodes, respectively. Therefore, it is appropriate to arrange counter electrodes and control electrodes in different layers. Preferably, the counter electrodes are arranged in the intermediate layer. In particular in case that the control electrodes are arranged in the cover layer as well as in the final layer, an optimized electric field develops in direction of both the upper and the lower cavity by means of only one counter electrode.

According to an alternative embodiment, it is however also possible to arrange the control electrode in the intermediate layer. Consequently, the at least one counter electrode is arranged in the cover layer and/or in the final layer to achieve at an optimized electric field.

According to the invention, it is provided in a preferred embodiment to make the intermediate layer to be reflective at on least one side, so that light incident from viewing direction is reflected thereby. In this way, visibility of a fluid volume optionally present in the upper cavity is possible without supplying for example electrical energy for a supplemental light source by utilizing ambient light existing anyway.

It is in the sense of the invention that, if there is need, also several fluids, for example two different fluids, may be used in a single display element. It should always be ensured thereby that the fluids are immiscible. In particular preferred are combinations of aqueous and oil containing liquids which in contact always comprise clearly perceivable interfaces.

In this embodiment, it is in particular preferred that one of the two fluids is coloured, the other one transparent. However, it is also possible, to use two differently coloured fluids or fluids having other different characteristics, for example relating to the reflection properties.

For realizing the shape stability of the fluid volume which is essential for the invention during transporting into and out from in particular the visible volume, it is in particular preferred to use volumes having rectangular foot print.

BRIEF DESCRIPTION OF THE DRAWINGS

Details of the invention are explained with the aid of exemplary embodiments which are schematically represented in the figures. It is shown in.

DETAILED DESCRIPTION OF THE INVENTION

Figure 1:
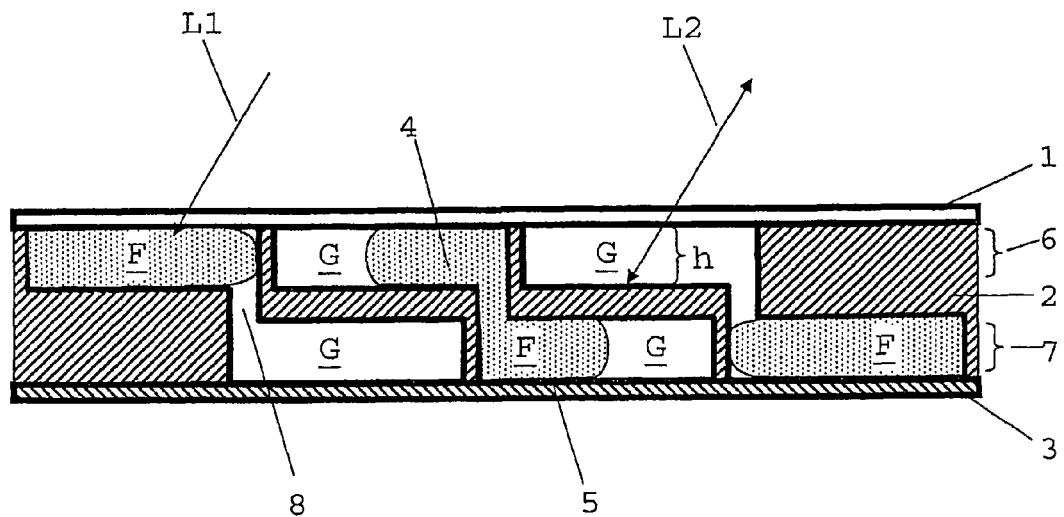
FIG. 1 a section through a schematic side view of a first embodiment of the apparatus according to the invention.

FIG. 1 represents a section through a schematic side view of a first embodiment of the apparatus according to the invention. Accordingly, the apparatus of the invention comprises a first layer 1 which serves as a cover layer and is particularly preferred transparent or opaque in an optical wave length range. In the viewing direction perpendicular to layer 1 a second layer 2 (intermediate layer) is arranged below. Finally there is as a last third layer 3, a final layer.

Since first and second layers 1, 2 are spaced apart by a constant distance, one or several upper volumes 4 having a height h are formed between them. Since first and second layers 1, 2 are parallel, height h is always constant. Consequently, it is excluded that differently thick layers of a fluid are present in a volume as long as it is ensured that the respective volume is completely filled.

Similarly, one or several lower volumes 5 are formed between second layer and third layer 2, 3 which again comprise the same height.

Upper volumes 4 are located in a first upper plane 6, lower volumes 5 in a second lower plane 7. It is in particular preferred that the two planes 6, 7 respectively have the same height.

To enable an exchange of fluid F between the two planes, respective first fluidic transitions 8 are provided. It is in particular preferred that they are orthogonal to intermediate layer 2.

According to the invention it is provided with respect to the represented embodiment that volumes 4, 5 associated to a display element are not arranged one above the other, but offset from another. This configuration likewise represents a space saving alternative configuration of volumes 4, 5.

As it is apparent from FIG. 1, both fluid F and gas G are present in volumes 4, 5. According to the desired display state of a display element, the fluid F is located in upper volume 4 or in lower volume 5. In the first case, a light beam L1 is absorbed by fluid F present in upper volume 4, so that this volume is perceived as dark as seen by a viewer. In the second case, light beam L2 is reflected at intermediate Layer 2 due to absence of fluid F, so that the respective display element may be perceived as bright. It is in particular preferred that a least the surface of intermediate layer 2 facing upward in the figure is made reflective for light in the visible range. In the represented embodiment both volumes 4, 5 essentially have the same geometry and correspondingly the same capacity. The total capacity of both volumes 4, 5 is respectively filled equally with fluid F and gas G. According to a further embodiment which is not represented here, a second fluid is used instead of gas which is immiscible with first fluid F.

Electrodes which are necessary in particular for using the electro wetting effect are not represented for reasons of clarity. They may be arranged in all three layers 1, 2 and/or 3. It is in particular preferred to arrange the counter electrode in intermediate layer 2 and the control electrodes in the cover layer and/or in the final layer.

Figure 2:
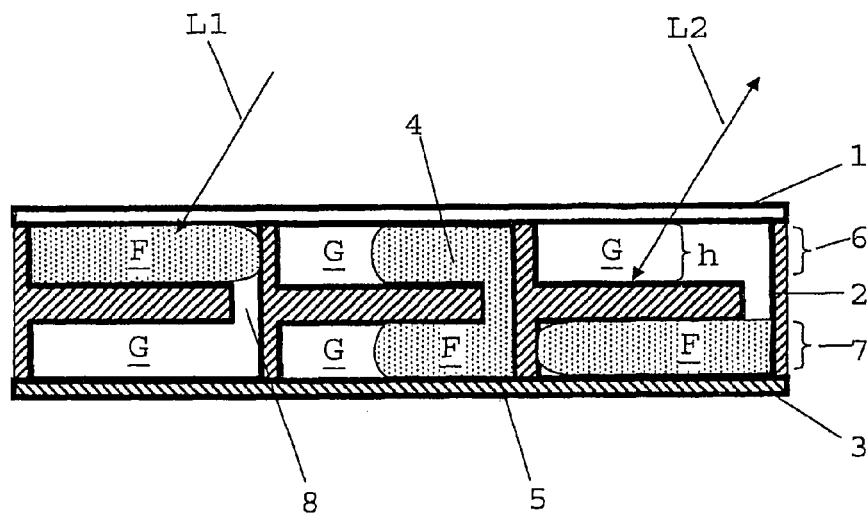
FIG. 2 a section through a schematic side view of a second embodiment of the apparatus according to the invention.

FIG. 2 represents a section through a schematic side view of a second embodiment of the apparatus according to the invention. An essential difference to the embodiment represented in FIG. 1 is the arrangement of upper volumes 4 in relation to lower volumes 5 associated with the respective display element. According to this embodiment, volumes 4, 5, seen in viewing direction, are respectively arranged one after the other. Apart from that, the above explanations with respect to FIG. 1 apply, so that it is unnecessary to restate them here.

Figure 3:
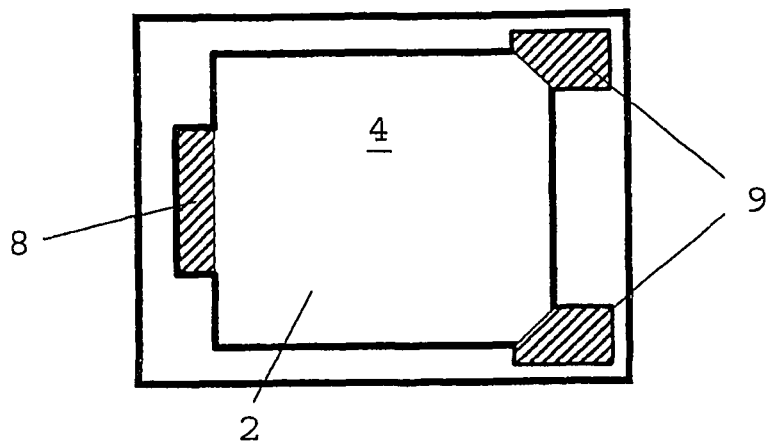
FIG. 3 a top view of a schematically represented display element of the invention according to the second embodiment.

FIG. 3 shows a top view of a schematically represented display element of the invention according to the second embodiment. The display element, thereby, has substantially rectangular shaped. Upper volume 4, intermediate layer 2 as well as parts of final layer 3 (in a hatched representation) visible in this perspective are illustrated. Substantially transparent cover layer 1 which is not represented comprises in the regions of fluidic transitions 8, 9 non-transparent areas, so that a fluid optionally present is lower volume 5 is not visible by a viewer.

A first fluidic transition 8 (on the left hand side in the figure) is located at a longitudinal side of volume 4. Primarily, this transition 8 is for transfer of fluid (not represented) through intermediate layer 2. In corners opposite to this transition (top right hand side and bottom right hand side in the figure), two further fluidic transition 9 are provided. Primarily, they are provided for fluidic pressure balance between the two volumes 4, 5 of a display element.

Figure 4:
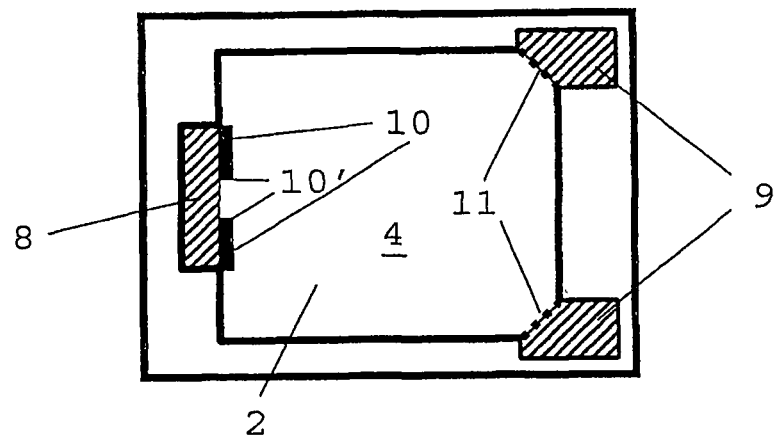
FIG. 4 an addition to the top view of FIG. 3 comprising structures to avoid an undesired fluid transfer.

FIG. 4 shows an addition to the top view of FIG. 3 comprising structures to avoid an undesired fluid transfer. They are located both at fluidic transition 8 and at both further transitions 9.

In the region of first transition 8 which is for transfer of fluid through intermediate layer 2, two structures in form of wings 10 which are arranged symmetrically with respect to transition 8, are provided. They may extend over the entire height of volume 4. In this case they comprise an interruption through which fluid (not represented) from upper volume 4 may reach first transition 8. Due to additional edges 10' of wings 10, a fluid droplet which is to leave upper volume 4 needs a higher energy supply to change its surface energy sufficiently strong so that it may pass the respective transition. A transfer solely by influence of mechanical energy is much more difficult. In an alternative embodiment, the mentioned structures represent walls which extend only over a part of the total height of volume 4. It is in particular preferred that the wall comprises a height which is nearly 10% of the total height of volume 4. Also in this situation, the droplet is effectively kept away from transition region 8 with the aid of the wall, as long as it is desired. Only by applying an electric field, the fluid is able to pass the described wall and to enter into the transition region 8.

Likewise, in the regions of further transitions 9 which are provided for fluidic pressure balance between the two volumes 4, 5, respective stopper structures 11 are located which are hatched in FIG. 4 to indicate that they are solid but do not extend over the entire height of the volume. Correspondingly, the stopper structures 11 may also be described as a bank.

According to further embodiments which are not represented, wings 10 and/or stopper structures 11 may for example consist of several single segments extending over the entire height of the volume. The segments may also be connected by means of one or several bridges which are less high. It is possible that these bridges border the intermediate layer or the cover or final layer, respectively, or do not contact any of these layers.

Figure 5:
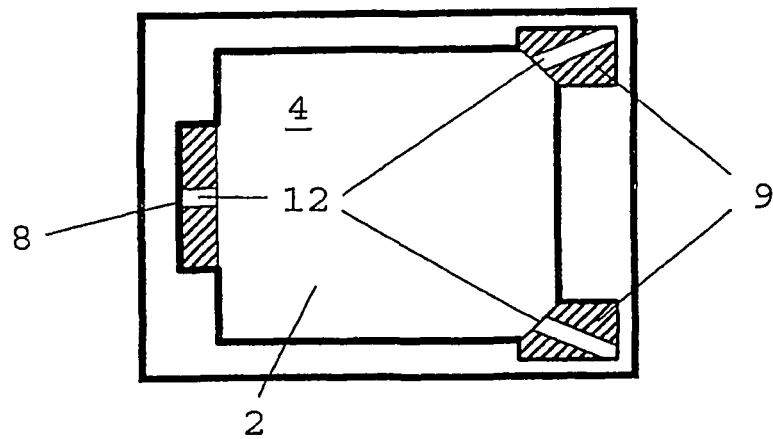
FIG. 5 another addition to the top view of FIG. 3 or 4, respectively, comprising alternative structures to avoid an undesired fluid transfer.

FIG. 5 shows another addition to the top view of FIG. 3 or 4, respectively, comprising alternative structures to avoid an undesired fluid transfer. Accordingly, to avoid an undesired transfer of fluid from one plane to the other in the region of transitions 8, 9, at least one bar 12 splitting or reducing, respectively, transition 8, 9 is provided. According to the Figure, bar 12 is arranged such that the respective transition 8, 9 is divided into two partial transitions of same size and comprising equal edge lengths, wherein the lengths of the bar is minimal. The narrow edge of a bar 12 thereby extends approximately perpendicular from a respectively bordering edge of intermediate layer 2 to an opposite wall of cavity 4. The thickness of bar 12 extending perpendicular to the drawing plane thereby corresponds to the thickness of intermediate layer 2. It is therefore unnecessary (even though not excluded) that bar 12 comprises a bank or wall like structure having correspondingly larger thickness.

The arrangement of several, optionally crossing bars in a respective transition 8, 9 is not represented, but also possible, to increase the length of the corresponding edges, wherein the bars should be as thin as possible, so that the transition is not significantly diminished which would hinder (desired) passing. By extending the edges, surface energy of the fluid must change more to overcome the bars. As per mechanical strain, more or less bars may be provided, wherein the number of bars or the lengths of the bar edges, respectively, should be higher for increasing strain. Thus, grid like structures of structures having a plurality of holes in the region of the openings could be provided if necessary with regard to the strain.

The features disclosed in the foregoing description, in the claims and/or in the accompanying drawings may, both separately and in any combination thereof, be material for realising the invention in diverse forms thereof.

The invention claimed is:

1. An apparatus for displaying information, comprising at least one display element, including:
   a fluid, the surface energy of which can be varied by means of an electric field;
   a first and a second volume for receiving said fluid, wherein only the first volume is visible and the volumes are separated by a non-transparent intermediate layer; and
   a fluidic transition between said first and said second volume,
   wherein said first volume is arranged between an optically transparent cover layer and said non-transparent intermediate layer and said second volume is arranged between said intermediate layer and a final layer and all layers are parallel across their entire area, and wherein said first and said second volume and the volume of the fluid are equal;
   the fluidic transition connects a lateral end of said first volume with a lateral end of said second volume fluidically, in viewing direction perpendicular to the visible first volume, so that the fluid volume is conveyed dimensionally stable from the one volume into the other volume parallel to the layers to the fluidic transition, so that always that fraction of the fluid volume which is present in the visible volume extends over the entire height between said cover layer and said intermediate layer, and so that when discharging the fluid, a fluid-free space occurs in the respectively emptied volume at the end opposite the lateral end.

2. The apparatus of claim 1, wherein the fluidic transition is a duct making a shortest connection between the volumes and is therefore perpendicular to the parallel layers.

3. The apparatus of claim 1, wherein the apparatus comprises several display elements and the second volume of a display element is arranged below the first volume of an adjacent display element, at least except for the region of the fluidic transition.

4. The apparatus of claim 1, wherein both volumes of a display element are arranged after another when seen in viewing direction.

5. The apparatus of claim 1, wherein the intermediate layer comprises at least one further fluidic transition for fluidic pressure balance between the two volumes.

6. The apparatus of claim 5, wherein two of the further fluidic transitions are provided for fluidic pressure balance and at least two of the fluidic transitions are arranged at opposite ends of a volume.

7. The apparatus of claim 1, wherein, to avoid an undesired transfer of fluid from one into the other volume, a wall is arranged in at least one of the volumes.

8. The apparatus of claim 7, wherein the wall extends at least partly over the entire height of the respective volume.

9. The apparatus of claim 7, wherein the wall borders the fluidic transition, is perpendicular to the intermediate layer, extends over the entire height of the respective volume and comprises a central interruption of smaller height.

10. The apparatus of claim 7, wherein the wall borders the second fluidic transition serving for pressure balance, is perpendicular to the intermediate layer, extends over only a part of the entire height of the respective volume and comprises a central interruption.

11. The apparatus of claim 7, wherein the wall contains no interruptions and comprises a smaller height than the respective volume.

12. The apparatus of claim 1, wherein to avoid an undesired transfer of fluid from one volume into the other a bar splitting or reducing the transition is arranged in the region of the fluidic transition.

13. The apparatus of claim 1, wherein the apparatus includes at least one electrically conducting layer or coating for providing at least one counter electrode as well as a common control electrode for at least two display elements.

14. The apparatus of claim 1, wherein the apparatus includes at least one electrically conducting layer or coating for providing at least one counter electrode as well as individual control electrodes for each display element.

15. The apparatus of claim 13, wherein the counter electrode and the control electrodes are arranged in different layers.

16. The apparatus of claim 13, wherein the counter electrode is arranged within the intermediate layer.

17. The apparatus of claim 13, wherein the control electrodes are arranged within the intermediate layer.

18. The apparatus of claim 1, wherein the intermediate layer is configured reflective at least on one side, so that light incident from the viewing direction is reflected thereby.

19. The apparatus of claim 1, further comprising a second fluid which is immiscible with the first fluid.

* * * * *